Nov. 11, 1952 — E. A. ROCKWELL — 2,617,443
CHECK AND REGULATOR VALVE APPARATUS
Filed Aug. 22, 1945 — 2 SHEETS—SHEET 1

Inventor:
Edward A. Rockwell

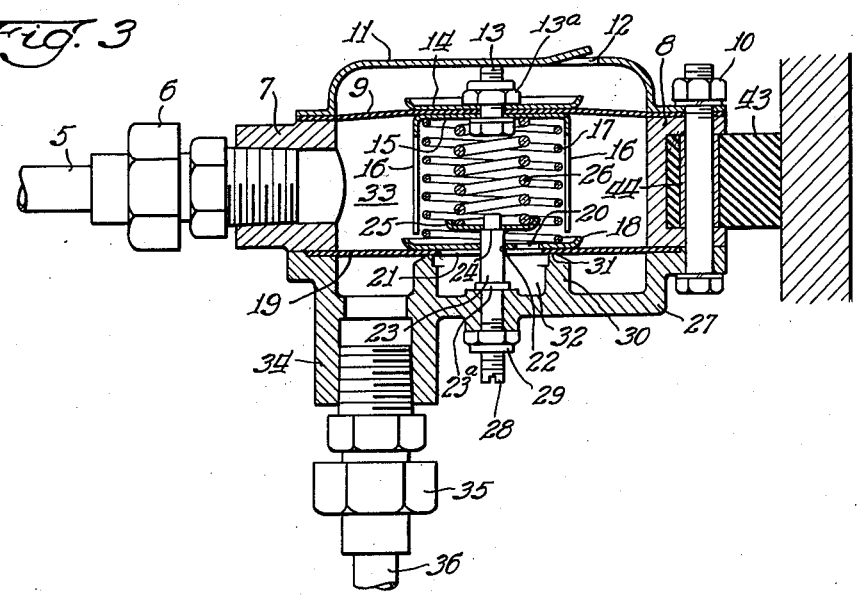
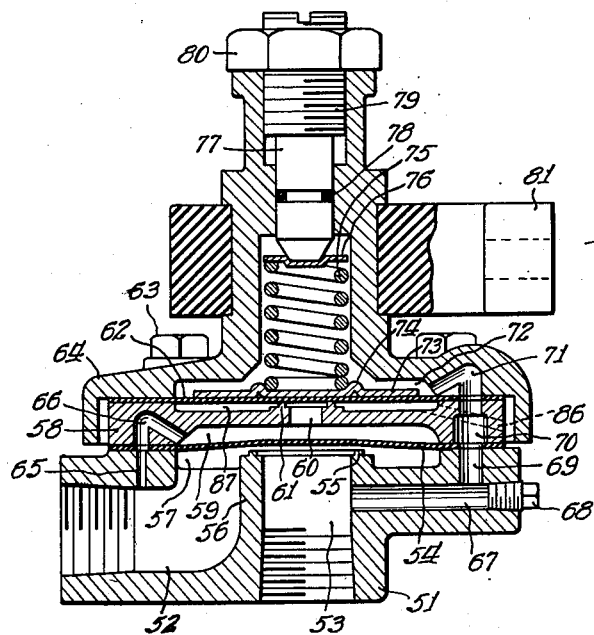

Patented Nov. 11, 1952

2,617,443

UNITED STATES PATENT OFFICE 2,617,443

CHECK AND REGULATOR VALVE APPARATUS

Edward A. Rockwell, Shaker Heights, Ohio, assignor, by mesne assignments, to Borg-Warner Corporation, Chicago, Ill., a corporation of Illinois Application August 22, 1945, Serial No. 611,986

21 Claims. (Cl. 137—480)

My invention relates particularly to a valve means adapted to act as a check valve, and also as a regulator valve, which is applicable to any desired type of apparatus for the control of fluid pressures, but which is especially applicable to the control of power units for operating vehicles, as for instance airplanes, automobiles, etc.

The object of my invention is to provide a control apparatus which is constructed to operate both as a check valve and a regulator valve. Another object is to provide a valve apparatus of this character which may be used to control fluid pressure operated power units—for example a power unit such as is disclosed in my copending application upon Power Intensifier Valve, Serial No. 388,003, filed April 11, 1941, now Patent No. 2,398,252. Another object is to provide a mechanism of this character, whereby a certain level of vacuum may be maintained for supplying a vacuum to fluid pressure operated hydraulic power units. Still another object is to provide means for preventing such power units from producing too high a hydraulic pressure. Accordingly, one of the objects is to provide means for preventing the delivery of too high a maximum hydraulic pressure to the brakes of an automobile when a high vacuum is being produced, as for instance in going down grades with throttle closed and when the engine is being driven by the traction of the vehicle. Further objects of my invention will appear from the detailed description of my invention hereinafter.

While my invention is capable of embodiment in many different forms, for the purpose of illustration I have shown only one form thereof in the accompanying drawings in which—

Fig. 3 is a vertical section of the same taken on line 3—3 of Fig. 2;

Fig. 4 is a vertical section of a modified form of my check and regulator valve.

Figure 1:
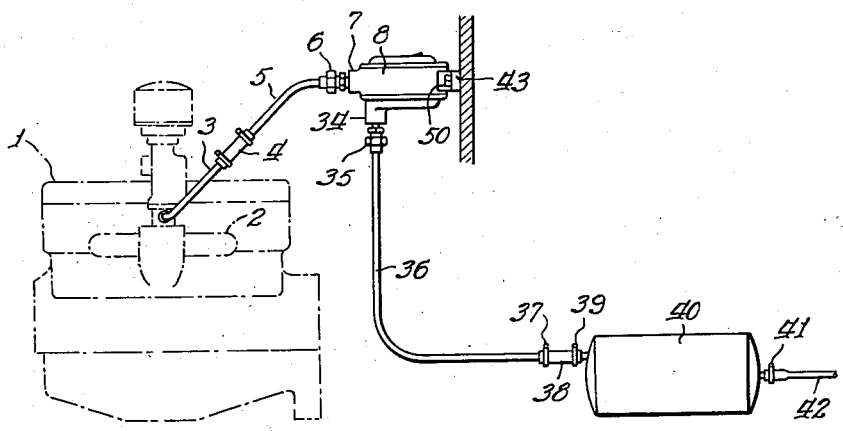
Fig. 1 is a diagrammatic side elevation of a system including an apparatus made in accordance with my invention and including a check and regulator valve connected to an engine manifold and delivering a controlled vacuum to a reservoir connected to a vacuum-operated hydraulic power unit.
Figure 2:
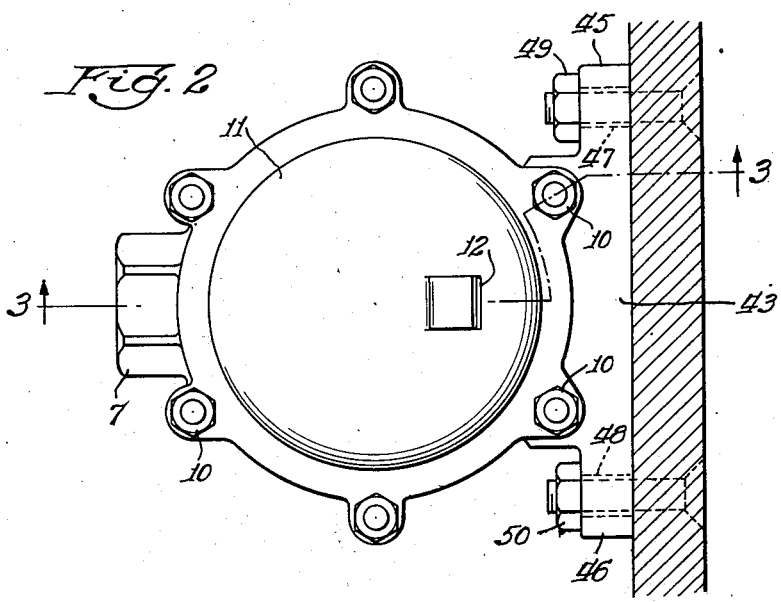
Fig. 2 is a plan view of the said apparatus.

In Figs. 1 to 3, I have shown an automobile engine 1, of the usual internal combustion type, for driving an automobile or other vehicle, having a manifold 2 which has a vacuum pipe 3 leading therefrom, connected by a flexible rubber hose 4 to a pipe 5 having a screw-threaded fitting 6 connecting it to a screw-threaded vacuum port connection 7 forming a part of an annular valve casing 8. Above the annular casing 8 there is a flexible diaphragm 9 held in place by a plurality of bolts 10 which pass through lugs on said casing 8 and through the rim of a cover plate 11 provided with a vent opening 12. The said cover plate 11, also, acts as a stop for the end of a screw 13, passing through the diaphragm 9, as well as through a flanged ring 14 above the diaphragm 9 and a disc 15 having four spring-retaining fingers 16 located below the diaphragm 9, a nut 13a being provided on the screw 13 to fasten the ring 14 and disc 15 in place on the diaphragm 9. The fingers 16 serve to hold in place a light helical spring 17, the upper end of which spring seats against the disc 15 and the lower end of which is supported by a cup-shaped disc 18 which is located above a lower flexible diaphragm 19 and has a lateral aperture 20 above a larger central aperture 21 in the diaphragm 19. There is, also, in the center of the cup-shaped disc 18 an opening 22 to receive a spring adjusting rod 23 having near its upper end a shoulder 24 carrying a small flanged disc 25 supporting above the same a stiff spring 26, the upper end of which is received around the lower end of the screw 13 against the disc 15. The said spring adjusting rod 23 also has a flange 23a resting against a lower valve casing 27 which clamps the diaphragm 19 against the lower face of the annular casing 8 by means of the bolts 10 which pass through the casing 27. The spring adjusting rod 23, furthermore, has a screw-threaded end 28 extending below the valve casing 27 and which is screw-threaded into the said valve casing 27 for adjustment therein, and is also provided with a locking nut 29 beneath the casing 27. Furthermore, spaced from the adjusting rod 23 and inside said casing 27 there is an annular flanged valve member 30, having an annular tapered valve seat 31 which cooperates with the under-face of the portion of the diaphragm 19 which is beneath the cup-shaped disc 18, so that the said portion of the diaphragm 19 acts as a check valve with the valve seat 31. In this way there is formed within the annular flange 30 a chamber 32 which communicates by a port 20 with a chamber 33, above the diaphragm 19, communicating with the vacuum connection 7. The said annular chamber 32, when the diaphragm 19 is in elevated position, also communicates with a vacuum port delivery connection 34 which is screw-threaded to receive a fitting 35 on a pipe 36 connected by a clamp 37 to a flexible pipe 38 which in turn is connected by a clamp 39 to a vacuum reservoir 40 having another clamp 41 connecting it to a flexible pipe 42 which leads to the vacuum inlet of any desired hydraulic power unit (not shown) and which may be used for the operation of the brakes or any other desired accessory of the vehicle. It will be noted from Figs. 1, 2 and 3, furthermore, that the annular casing 8 may be supported in any desired manner, as for instance by means of a rubber block 43 through which two of the bolts 10 pass, said block having metal bushings 44 passing through said block 43 around the bolts 10. The block 43, furthermore, may have ears 45 and 46 provided with holes 47 and 48 to receive bolts 49 and 50 for fastening the said block to a dash board of an automobile or other vehicle.

As shown in Fig. 4, I have provided a modified form of check and regulator valve, the same being provided with a lower diaphragm casing 51 having a screw-threaded vacuum inlet 52 arranged to be attached to the coupling 6 and pipe 5 which lead to the manifold 2, also with an outlet opening 53 adapted to be connected to the coupling 35 and pipe 36 leading to the reservoir 40. The said lower diaphragm casing 51 is arranged to support a flexible diaphragm 54 which acts as a valve in connection with a valve seat 55 located at the upper end of the outlet 53 but which, when open, allows unrestricted flow of the medium supplied to the reservoir 40. The valve seat 55 is located on a flange 56 within an annular chamber 57 which communicates with the vacuum inlet 52. Above the annular chamber 57 there is an annular spacing member 58 which has a chamber 59 therein leading by a passageway 60 to a valve seat 61 cooperating with an upper diaphragm 62 which serves as a valve member in connection with the annular valve seat 61. The diaphragms 62 and 54 are secured in place by a series of bolts 63 passing through an upper diaphragm casing 64, the annular spacing member 58 and the lower diaphragm casing 51.

Also, it will be noted that there is a restricted passageway 65 in the lower diaphragm casing 51 communicating with an angular passageway 66 in the annular casing 58 which communicates with the chamber 59 above the diaphragm 54. Also, in the lower diaphragm casing 51 there is a horizontal passageway 67, the end of which is normally closed by a screw plug 68 and which communicates with a vertical passageway 69 in said casing 51, connecting with a vertical passageway 70 in the annular casing 58, which in turn connects with an angular passageway 71 leading to a chamber 72 in the upper diaphragm casing 64.

This chamber 72 carries within the same, on top of the diaphragm 62, a spring supporting plate 73 provided with an annular ridge 74 to hold in place a helical spring 75 having on the upper end of the same a spring-retaining plate 76 adapted to be adjusted vertically by means of a screw 77 having an annular packing 78 and a screw-threaded end 79 over which there is carried a lock nut 80 resting on the end of the upper diaphragm casing 64. Around the body of the casing 64 there is located a clamp 81 for attaching the same to a vertical support, as for instance a dashboard of an automobile. It will be noted, also, that there is a vent passageway 86 leading to an air chamber 87 located beneath the diaphragm 62.

In the operation of my valve apparatus, as illustrated in Figs. 1 to 3, when the engine 1 is in operation there will be produced in the manifold 2 a vacuum which is conveyed by the pipes 3, 4 and 5 to the chamber 33. The check valve 19, 31, being normally closed by the light spring 17, will open as soon as the vacuum is received in said chamber 33, accompanied by the rise of the diaphragms 9 and 19, inasmuch as the movement of the diaphragm 19 upwardly, due to the atmospheric air pressure in the pipe 36, will also move the diaphragm 9 upwardly until the screw 13 reaches a stop position against the cover plate 11. The vacuum will thus be supplied by the pipes 36 and 38 to the vacuum reservoir 40 and thence by the pipe 42 to the said hydraulic power unit (not shown). As soon as the maximum desired level of vacuum is reached in the reservoir 40, the said level being determined by the manual adjustment of the screw 28, the diaphragm 19 will become seated on the valve seat 31 and remain in this position, with the check valve 31, 19 closed and the screw 13 spaced away from the cover 11 until the vacuum in the reservoir 40 fall slightly below the desired maximum level, due to the operation of the power unit or for any other reason. It will be noted, of course, that the more the adjusting screw 28 is moved upwardly by its adjustment, the greater will be the degree of vacuum trapped in the reservoir 40 which is required to keep the check valve 19, 31 in closed position, owing to the support by the spring 26 of the diaphragm 9. In this way, a constant high level of vacuum will be maintained by the valve apparatus, but this desired high level of vacuum will not be exceeded because as soon as too high a vacuum is conveyed to the chamber 33, this will establish the check valve 19, 31 in closed position, owing to the action of the vacuum on the diaphragm 9. By this means a maximum high level of vacuum is provided at all times, while preventing the application of too high a degree of vacuum, which, if permitted to be transmitted, would produce too high a hydraulic pressure from the power unit operated thereby.

In the operation of the modified form of my invention as shown in Fig. 4, a vacuum supply is conveyed thereto from the manifold 2 by the pipe 5 and is delivered therefrom through the pipe 36 to the vacuum reservoir 40, as described in connection with the form of my invention shown in the preceding figures. In this instance, however, the production of a vacuum above the desired maximum in the reservoir 40 is avoided primarily by the diaphragm 54 and valve seat 55 which act as a diaphragm check valve to prevent a vacuum exceeding the maximum being delivered to the outlet 53. The operation of this diaphragm valve 54, 55 is such that the valve is easy and uniform of operation by reason of the passageway 65, 66, which tends to equalize the pressures on the two sides of the diaphragm 54 due to the admission of some of the vacuum through the restricted port 65 to the chamber 59. However, should the vacuum in the reservoir 40 or delivery pipe 36 become excessive, the vacuum present in the passageway 67, 69 and 71 will lift the diaphragm 62 off the valve seat 61, on account of the presence of the atmosphere in the air chamber 87 so as to admit air to the chamber 59 and even therefrom through the passageways 66 and 65 to the vacuum inlet pipe 5. Normally, however, the diaphragm 62 will be maintained seated on its valve seat 61 by reason of the helical spring 75, the compression of which can be adjusted by means of the screw 79 having thereon the lock nut 80. In this way, an extraordinarily even performance of the valve 54, 55 is attained so as to maintain the vacuum within the reservoir 40 with substantially no variation whatever in spite of the extremely wide variations of vacuum which are present in the pipe 5, from the engine manifold, produced by the operation of the internal combustion engine of which the manifold 2 forms a part. When the vacuum is no longer present, however, the valve 54, 55 will return to its slightly open initial position. In other words, in this form of my invention a given desired pressure of my fluid medium can be maintained through the connection 35, notwithstanding wide differences of pressure of the fluid medium in the pipe 52, provided there is admitted through the passageway 86 from any desired source a fluid pressure which is substantially constant.

While I have described my invention above in detail, I wish it to be understood that many changes may be made therein without departing from the spirit of the same.

I claim:

1. In a fluid controlling device of the character described, an enclosure having a constant pressure port provided with a connection for work performance, having a valve seat located on said port, a variable pressure port and a check and regulator valve connected to interrupt the flow by the valve seating on said valve seat between said ports in a direction contrary to the normal flow of fluid between said ports having means arranged with a venting passageway to control said valve so as to maintain the said constant pressure by the variable pressure.

2. A valve apparatus comprising an enclosure having a port adapted to be connected to an area having a pressure differing from the atmospheric pressure, a port adapted to be connected to a relatively higher pressure work performing area, a check valve, comprising a diaphragm and diaphragm valve seat, located on said higher pressure port to seat the diaphragm toward the high pressure work performing area to cut off the pressure differing from the atmospheric pressure between said ports, and means for seating said diaphragm including a passageway connected to the second mentioned port when said pressure supplied to the last mentioned port decreases beyond a given limit, the first mentioned port having a restricted passageway leading to the other side of the diaphragm from said valve seat.

3. A valve apparatus comprising an enclosure having a port adapted to be connected to an area having a pressure differing from the atmospheric pressure, a port adapted to be connected to a relatively higher pressure work performing area, a diaphragm check valve located on said higher pressure port to seat the valve toward the high pressure work performing area to cut off the pressure differing from the atmospheric pressure between said ports, means for seating said check valve including a passageway connected to the second mentioned port when the pressure supplied to the last mentioned port decreases beyond a given limit and a restricted by-pass between the two sides of the diaphragm.

4. A valve apparatus comprising an enclosure having a port connected to an area having a pressure differing from the atmospheric pressure, a port connected to a relatively higher pressure area, a check valve located between said ports, diaphragm valve controlling means for seating said check valve when the pressure supplied to the last mentioned port varies beyond a given limit, and a vent leading to one side of the diaphragm of said valve controlling means, said apparatus having a passageway leading from the higher pressure port to the side of the last mentioned diaphragm opposite to said vent.

5. A valve apparatus comprising an enclosure having a port connected to an area having a pressure differing from the atmospheric pressure, a port connected to a relatively higher pressure area, a check valve located between said ports, diaphragm valve controlling means for seating said check valve when the pressure supplied to the last mentioned port varies beyond a given limit, and a vent leading to one side of the diaphragm of said valve controlling means, said apparatus having a passageway leading from the higher pressure port to the side of the last mentioned diaphragm of said valve controlling means opposite to said vent, said diaphragm valve controlling means being located between the vent and the check valve.

6. A valve apparatus comprising an enclosure having a port connected to an area having a pressure differing from the atmospheric pressure, a port connected to a relatively higher pressure area, a diaphragm check valve located between said ports, diaphragm valve controlling means for seating said check valve when the pressure supplied to the last mentioned port varies beyond a given limit, and a vent leading to one side of the diaphragm of said valve controlling means, said apparatus having a passageway leading from the higher pressure port to the side of the last mentioned diaphragm opposite to said vent, said diaphragm valve controlling means being located between the vent and the diaphragm check valve, and said apparatus having a restricted passageway connecting the two sides of the diaphragm check valve.

7. A valve apparatus, comprising an enclosure, a diaphragm check valve having a valve seat in said enclosure, a variable low pressure port and a substantially constant higher level pressure port for work performance on which port the valve seat is located, said higher level pressure port having connected therewith a reservoir for a pressure differing from the atmospheric pressure, said ports being located on the same side of said diaphragm on opposite sides of the valve seat, said diaphragm check valve and valve seat being so located as to cut off the low pressure port from the higher level pressure port.

8. A valve apparatus comprising an enclosure, a diaphragm check valve having a valve seat in said enclosure, a variable low pressure port and a substantially constant higher level pressure port for work performance having connected therewith a reservoir for a pressure differing from the atmospheric pressure, said ports being located on the same side of said diaphragm on opposite sides of the valve seat, said variable low pressure port having a restricted passage leading to the other side of the diaphragm and said diaphragm check valve and valve seat being located so as to cut off the low pressure port from the higher level pressure port.

9. A valve apparatus, comprising an enclosure, a check valve having a valve seat in said enclosure, a variable low pressure port, a substantially constant higher level work performing pressure port, said ports being located on the same side of said check valve on opposite sides of the valve seat which is located on said higher pressure port to seat the valve towards the higher level work performing pressure port to cut off the said low pressure, and means including a passageway connected to the second mentioned port to admit a substantially uniform pressure that is still higher to the other side of the check valve when a given pressure limit is exceeded in the constant higher level pressure port.

10. A valve apparatus, comprising an enclosure, a check valve having a valve seat in said enclosure, a variable low pressure port, a substantially constant higher level pressure port, said ports being located on the same side of said check valve on opposite sides of the valve seat, and means to admit a substantially uniform pressure that is still higher to the other side of the check valve when a given pressure limit is exceeded in the constant pressure port, said means comprising a diaphragm controlling a vent controlled by a passageway leading to the constant pressure port.

11. A valve apparatus comprising an enclosure, a diaphragm check valve having a valve seat in said enclosure, a variable low pressure port, a substantially constant higher level pressure port, said ports being located on the same side of said diaphragm of said check valve on opposite sides of the valve seat, and manually adjustable means to admit a substantially uniform pressure that is still higher than both said pressures to the other side of the said diaphragm when a given pressure limit is exceeded in the constant pressure port.

12. In a device of the character described, an enclosure having a fluid pressure outlet port and a fluid pressure inlet port, a biased element having an area subject to the inlet fluid pressure, a valve having opposed areas communicating with the outlet port when the valve is closed, and a means for applying atmospheric air pressure to close said valve, including a vent and a valve seat for said biased element controlling communication between the vent and said valve, brought into action by a passageway connecting the inlet fluid pressure to said area to overcome the bias of said element and close said valve when the pressure condition exceeds a certain limit in the inlet port.

13. In a device of the character described, an enclosure having a fluid pressure outlet port and a fluid pressure inlet port, a biased diaphragm having an area subject to the inlet fluid pressure, a valve having opposed areas communicating with the outlet port when the valve is closed, and a means for applying atmospheric air pressure to close said valve, including a vent and a valve seat for said biased diaphragm controlling communication between the vent and said valve, brought into action by a passageway connecting the inlet fluid pressure to said area to overcome the bias of said diaphragm and close said valve when the pressure condition exceeds a certain limit in the inlet port.

14. In a device of the character described, an enclosure having a fluid pressure outlet port and a fluid pressure inlet port, a biased diaphragm having an area subject to the inlet fluid pressure, a valve diaphragm having opposed areas communicating with the outlet port when the diaphragm is closed, and a means for applying atmospheric air pressure to close said valve diaphragm, including a vent and a valve seat for said biased diaphragm controlling communication between the vent and said valve diaphragm, brought into action by a passageway connecting the fluid pressure to said area to overcome the bias of said diaphragm and close said valve diaphragm when the pressure condition exceeds a certain limit in the inlet port.

15. A fluid pressure valve apparatus, comprising an enclosure having an outlet port connected to a pressure differing from the atmospheric pressure, an inlet port connected to a relatively higher pressure, a pressure delivering valve having an open passageway between said ports except when closed by said valve, and means having a passageway at all times in communication with the inlet port for closing the said valve suddenly when the pressure in the inlet port varies beyond a given limit without requiring a reversal of the flow of the fluid.

16. A fluid pressure valve apparatus comprising an enclosure having an outlet port connected to a pressure differing from the atmospheric pressure, an inlet port connected to a relatively higher pressure, a pressure delivering valve having an open passageway between said ports except when closed by said valve, and means, including a biased element, at all times in communication with the inlet port for closing the said valve suddenly, by overcoming the bias of said element, when the pressure in the inlet port varies beyond a given limit, without requiring a reversal of the flow of the fluid.

17. A fluid pressure valve apparatus comprising an enclosure having an outlet port connected to a pressure differing from the atmospheric pressure, an inlet port connected to a relatively higher pressure, a pressure delivering valve having an open passageway between said ports except when closed by said valve, and means, including a biased diaphragm, at all times in communication with the inlet port for closing the said valve suddenly, by overcoming the bias of said diaphragm, when the pressure in the inlet port varies beyond a given limit, without requiring a reversal of the flow of the fluid.

18. A fluid pressure valve apparatus comprising an enclosure having an outlet port connected to a pressure differing from the atmospheric pressure, an inlet port connected to a relatively higher pressure, a pressure delivering valve diaphragm having an open passageway between said ports except when closed by said diaphragm, and means, including a biased diaphragm, at all times in communication with the inlet port for closing the said valve suddenly, by overcoming the bias of said diaphragm, when the pressure in the inlet port varies beyond a given limit, without requiring a reversal of the flow of the fluid.

19. A fluid pressure valve apparatus comprising an enclosure having a port connected to an area having a pressure differing from the atmospheric pressure, a port connected to a relatively higher pressure area, a pressure delivering valve located between said ports having one surface in communication with the higher pressure area port and opposed surfaces in communication with the first mentioned area port when the valve is closed, and means, having a passageway in communication with the higher pressure port, for seating said valve when the pressure in the higher pressure area port decreases beyond a given limit.

20. A fluid pressure valve apparatus comprising an enclosure having a port connected to an area having a pressure differing from the atmospheric pressure, a port connected to a relatively higher pressure area, a pressure delivering valve, comprising a diaphragm and diaphragm valve seat, located between said ports having one surface in communication with the higher pressure area port and opposed surfaces in communication with the first mentioned area port when the valve is closed, and means, having a passageway in communication with the higher pressure port, for seating said diaphragm when the said pressure in the higher pressure area port decreases beyond a given limit.

21. A valve apparatus comprising an enclosure having a port adapted to be connected to a vacuum area, a port adapted to be connected to a relatively higher pressure work performing area, a check valve comprising a diaphragm and a valve seat located to seat the diaphragm on said high pressure port toward the high pressure work performing area to cut off the vacuum between said ports, and means having a passageway at all times open to the higher pressure port for seating said diaphragm when the pressure in the last mentioned port reaches a lower limit, said enclosure comprising an annular casing on which the check valve diaphragm is mounted and an end casing having an annular flange carrying the said valve seat.

EDWARD A. ROCKWELL.

REFERENCES CITED

The following references are of record in the file of this patent:

UNITED STATES PATENTS

| Number | Name | Date |
|---|---|---|
| 386,043 | Timlin | July 10, 1888 |
| 1,987,666 | Carlson | Jan. 15, 1935 |
| 2,072,868 | Chandler | Mar. 9, 1937 |
| 2,187,768 | Arquint | Jan. 23, 1940 |
| 2,265,210 | Waddell | Dec. 9, 1941 |
| 2,366,144 | Griswold | Dec. 26, 1944 |
| 2,467,813 | Coney | Apr. 19, 1949 |